United States Patent [19]

Kanno et al.

[11] Patent Number: 4,777,919

[45] Date of Patent: Oct. 18, 1988

[54] IGNITION TIMING CONTROL APPARATUS FOR AN INTERNAL COMBUSTION ENGINE

[75] Inventors: Yoshiaki Kanno; Katsuya Nakamoto; Jiro Sumitani, all of Himeji, Japan

[73] Assignee: Mitsubishi Denki Kabushiki Kaisha, Japan

[21] Appl. No.: 48,899

[22] Filed: May 12, 1987

[30] Foreign Application Priority Data

May 13, 1986 [JP] Japan .................. 61-111304
May 13, 1986 [JP] Japan .................. 61-111305

[51] Int. Cl.⁴ ............................................ F02P 5/15
[52] U.S. Cl. .................................. 123/416; 123/494
[58] Field of Search ............... 123/416, 417, 487, 494

[56] References Cited

U.S. PATENT DOCUMENTS

| | | | |
|---|---|---|---|
| 3,818,877 | 6/1974 | Barrera et al. .................. | 123/494 |
| 4,009,697 | 3/1977 | Chateau .......................... | 123/416 |
| 4,140,087 | 2/1979 | Daumer et al. ................ | 123/487 X |
| 4,244,339 | 1/1981 | Gorille ............................ | 123/416 |
| 4,257,377 | 3/1981 | Kinugawa et al. ............. | 123/492 |
| 4,263,884 | 4/1981 | Suzuki et al. ................... | 123/494 X |
| 4,385,606 | 5/1983 | Hattori et al. .................. | 123/416 |
| 4,424,568 | 1/1984 | Nishimura et al. ............ | 364/431.07 |
| 4,454,845 | 6/1984 | Takase ............................. | 123/416 X |
| 4,501,249 | 2/1985 | Amano et al. .................. | 123/494 X |
| 4,594,987 | 6/1986 | Wataya et al. ................. | 123/494 |
| 4,683,539 | 7/1987 | Kanno et al. ................... | 364/431.05 |
| 4,694,806 | 9/1987 | Wataya et al. ................. | 123/494 |
| 4,697,563 | 10/1987 | Becker et al. . | |
| 4,706,634 | 11/1987 | Nishikawa et al. ............ | 123/492 |

FOREIGN PATENT DOCUMENTS 45832 11/1984 Japan .
2160039 12/1985 United Kingdom .
2178196 2/1987 United Kingdom .

Primary Examiner—Tony M. Argenbright
Attorney, Agent, or Firm—Leydig, Voit & Mayer

[57] ABSTRACT

An ignition timing control apparatus for an internal combustion engine has an air flow sensor for sensing the air flow rate into the air intake pipe of the engine and producing an electrical output signal in the form of pulses having a frequency which is proportional to the air flow rate, and a crank angle sensor for producing an electrical output pulse each time the crankshaft of the engine is at a prescribed crank angle. A pulse counter counts the number of output pulses from the air flow sensor between consecutive output pulses of the crank angle sensor. A controller controls the current to an ignition coil based on the engine rotational speed and on either the output of the pulse counter, or on the output of a calculating mechanism which calculates the amount of intake air into the cylinders of the engine between consecutive output pulses of the crank angle sensor based on the output of the pulse counter.

6 Claims, 10 Drawing Sheets (a) CRANK ANGLE SENSOR 17
(b) 1° PULSES FROM INTERFACE 45
(c) TIMER 47
(d) TIMER 46
(e) FLIP-FLOP 48
(f) IGNITION COIL 19

IGNITION TIMING CONTROL APPARATUS FOR AN INTERNAL COMBUSTION ENGINE

BACKGROUND OF THE INVENTION

This invention relates to an ignition timing control apparatus for an internal combustion engine which measures the rate of air intake into the engine using an air flow sensor and controls the firing of the spark plugs of the engine based on the output of the air flow sensor.

In an internal combustion engine, it is conventional to dispose an air flow sensor (hereinunder abbreviated as AFS) in an air intake passageway upstream of the throttle valve of the engine and to calculate the rate of air intake per each engine revolution based on the output of the AFS. The injection timing is then controlled based on the calculated intake air flow rate.

In a conventional ignition timing control apparatus, the output from the AFS is generally in analog form, and it must be converted into a digital value at prescribed intervals and then divided by the number of engine revolutions per unit time in order to calculate the rate of air intake per each engine revolution. A relatively long time is required to perform the A/D conversion and the division by the number of engine revolutions per unit time, which is constantly changing. As a result, the responsiveness of ignition timing control is poor.

Furthermore, since the AFS is disposed upstream of the throttle valve, the air flow rate measured by the AFS does not always coincide with the actual air flow rate into the engine cylinders. In particular, when the throttle valve is abruptly opened, there is a sudden increase in the air flow through the AFS, but due to the provision of a surge tank between the throttle valve and the engine cylinders, the increase in the air flow rate into the cylinders is more gradual and of a smaller magnitude than that into the AFS. Accordingly, the air flow measured by the AFS is greater than the actual air flow into the engine, and if the ignition timing were controlled based solely on the value measured by the AFS during a single brief period when the air flow rate was in transition, the ignition timing would be inaccurate.

SUMMARY OF THE INVENTION

It is therefore an object of the present invention to provide an ignition timing control apparatus which performs a minimum of calculations and which has good responsiveness.

It is another object of the present invention to provide an ignition timing control apparatus for an internal combustion which can accurately control the ignition timing even when the intake air flow rate into the engine is in transition.

In an ignition timing control apparatus in accordance with the present invention, the intake air flow rate into the air intake pipe of an engine is measured by a Karman vortex air flow sensor, and the engine load is sensed by load sensing means based on the number of output pulses of the air flow sensor between prescribed crankshaft angles of the engine. The ignition timing of the engine is calculated by a controller based on the output of the load sensing means and the engine rotational speed, and the current to the ignition coil of the engine is controlled based on the calculated ignition timing.

In one form of the invention, the ignition timing is calculated by the controller based on the intake air flow rate into the air flow sensor during a certain period, such as during a single half-revolution of the engine. The number of calculations necessary in order to determine the ignition timing are minimized so as to obtain extremely good responsiveness.

In another form of the invention, a calculating mechanism calculates the intake air flow rate into the cylinders of the engine during the same period based on the output of the air flow sensor. The controller then calculates the ignition timing based on the output of the calculating mechanism. Accordingly, the ignition timing can be controlled accurately even when the intake air flow rate is in transition.

BRIEF DESCRIPTION OF THE DRAWINGS

In the drawings, the same reference numerals indicate the same or corresponding parts.

DESCRIPTION OF THE PREFERRED EMBODIMENTS

Figure 1:
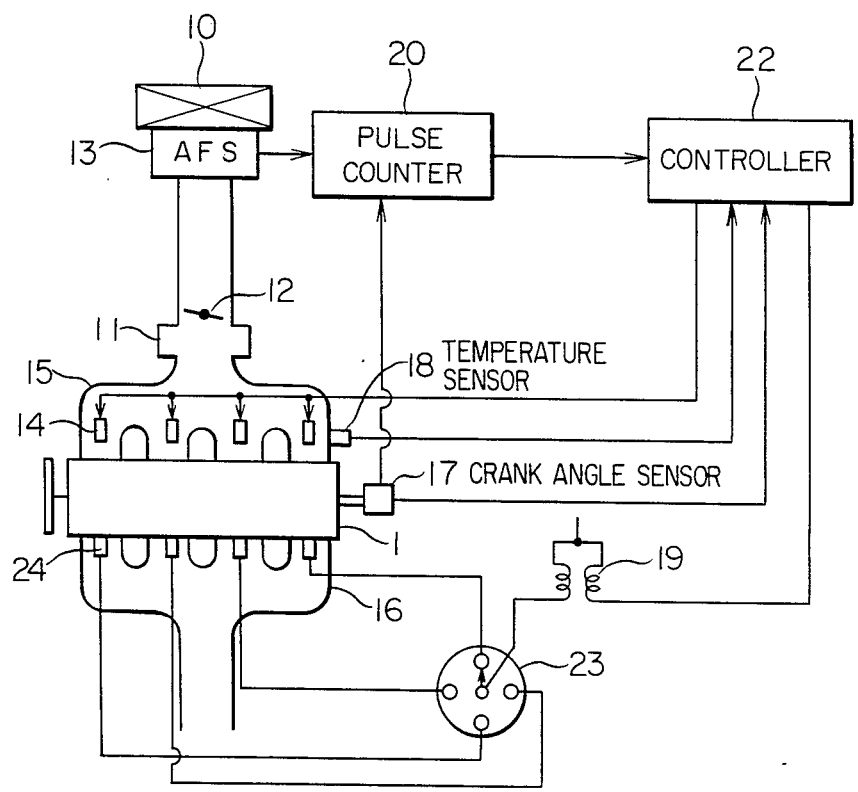
FIG. 1 is a block diagram conceptually illustrating the construction of a first embodiment of an ignition timing control apparatus in accordance with the present invention.

Hereinbelow, several preferred embodiments of an ignition timing control apparatus in accordance with the present invention will be described while referring to the accompanying drawings. FIG. 1 is a block diagram which conceptually illustrates the structure of this embodiment as applied to a four-cylinder internal combustion engine 1. The engine 1 has an air intake pipe 15, at the upstream end of which is installed a Karman vortex AFS 13. The AFS 13 produces electrical output pulses having a frequency corresponding to the intake air flow rate through the AFS 13. An air cleaner 10 is disposed upstream of the AFS 13. The air intake pipe 15 is equipped with a surge tank 11, a throttle valve 12, and four fuel injectors 14, each of which supplies fuel to one of the four cylinders of the engine 1. Combustion gas is exhausted from the engine 1 through an exhaust pipe 16. The engine 1 is further equipped with a crank angle sensor 17 which senses the angle of rotation of the crankshaft of the engine 1 and produces electrical output pulses at prescribed crank angles, such as one pulse for every 180 degrees of crankshaft rotation. The water temperature of the engine cooling water is measured by a water temperature sensor 18, comprising a thermistor or the like, which produces an electrical output signal corresponding to the temperature. Each of the cylinders of the engine 1 is equipped with a spark plug 24 which is electrically connected to an ignition coil 19 through a distributor 23.

An ignition timing control apparatus comprises the AFS 13, the crank angle sensor 17, a pulse counter 20 which counts the number of output pulses of the AFS 13 between consecutive pulses of the crank angle sensor 17, and a controller 22 which controls the fuel injectors 14 and the current to the ignition coil 19 based on the output from the pulse counter 20, the crank angle sensor 17, and the water temperature sensor 18. As the number of pulses counted by the pulse counter 20 between consecutive pulses from the crank angle sensor 17 is indicative of the load on the engine, the pulse counter 20 constitutes means for sensing the engine load.

Figure 2:
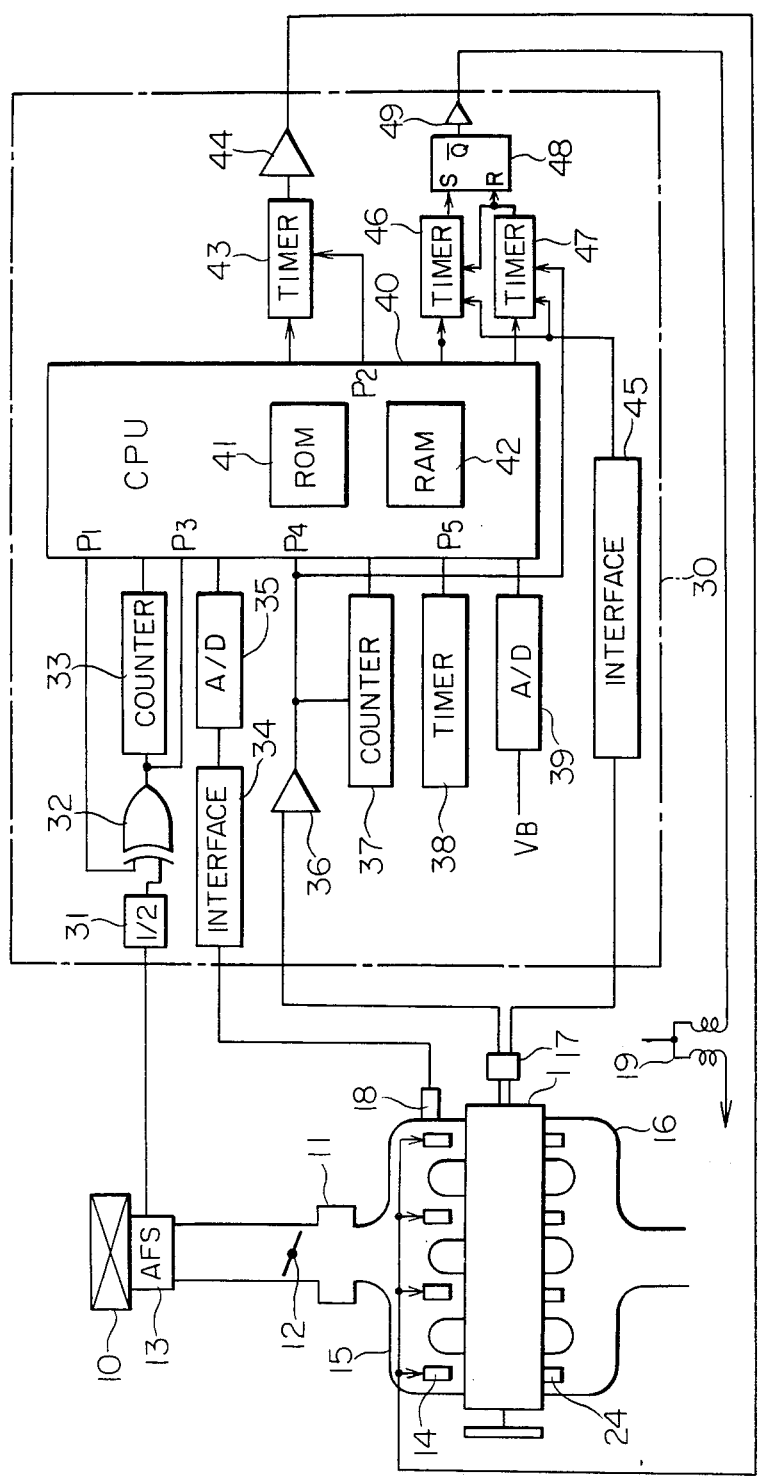
FIG. 2 is a block diagram illustrating the construction of the embodiment of FIG. 2 and the embodiment of FIG. 9 more concretely.

FIG. 2 shows the structure of this embodiment more concretely. The pulse counter 20 and the controller 22 together constitute a control unit 30 which controls the four injectors 14 and the ignition coil 19. The control unit 30 is controlled by a CPU 40 having a ROM 41 and a RAM 42. The output signal of the AFS 13 is input to a frequency divider 31 which produces an output signal having one-half the frequency of the AFS output signal. The output signal of the frequency divider 31 is input to one of the input terminals of an exclusive OR gate 32. The other input terminal is connected to an output port P1 of the CPU 40, whose output corresponds to the status of a frequency division flag in the RAM 42. The output terminal of the exclusive OR gate 32 is connected to a counter 33 and an interrupt input port P3 of the CPU 40. The output signal of the temperature sensor 18, which is an analog value, is input to an A/D converter 35 through an interface 34, and the digitalized value is input to the CPU 40. The output signal from the crank angle sensor 17 is input to a waveform shaper 36, and the shaped waveform is input to an interrupt input port P4 of the CPU 40, to a counter 37, and to a timer 47 as a trigger signal. The output signal from the crank angle sensor 17 is also input to an interface 45 which produces output pulses having a frequency which is 180 times that of the crank angle sensor 17. Each pulse from the interface 45 therefore corresponds to 1 degree of crankshaft rotation. The output signal from interface 45 is input to timer 47 and to another timer 46 as a clock signal. A timer 38 is connected to an interrupt input port P5 of the CPU 40. An unillustrated battery for the engine is connected to an A/D converter 39, which produces a digital output signal corresponding to the voltage $V_B$ of the battery and outputs the signal to the CPU 40. A timer 43 is set by the CPU 40 to an initial value and is triggered by an output signal from an output port P2 of the CPU 40. The output of timer 43 is input to a driver 44 which is connected to each of the four fuel injectors 14. The values to which the timers 46 and 47 are set are controlled by the CPU 40. The output of timer 47 is input to timer 46 as a trigger signal and to the reset input R of an S-R flip-flop 48, and the output of timer 46 is input to the set input S thereof. One output ($\overline{Q}$) of the flip-flop 48 is input to a driver 49, which provides current to the ignition coil 19.

Next, the operation of the embodiment illustrated in FIG. 2 will be explained. The output of the AFS 13 is frequency divided by the frequency divider 31, and the output thereof, which has a frequency which is half of that of the AFS output, is input to counter 33 through the exclusive OR gate 32, which is controlled by the CPU 40. Counter 33 measures the period between the falling edges of the output of the exclusive OR gate 32. Each time there is a fall in the output of the exclusive OR gate 32, which is input to interrupt input port P3, the CPU 40 performs interrupt handling and the period of counter 33 is measured. The interrupt handling is performed once every one or two periods of the output of the AFS 13, depending on the status of output port P1 of the CPU 40, which depends on the status of the frequency division flag within the RAM 42. The output of the water temperature sensor 18 is converted into a voltage by interface 34, the output of interface 34 is changed into a digital value by A/D converter 35 at prescribed intervals, and the output of A/D converter 35 is input to the CPU 40. The output of the crank angle sensor 17 is input to interrupt input port P4 of the CPU 40, to counter 37, and to timer 47 through the waveform shaper 36. The CPU 40 performs interrupt handling on each rising edge of the output of the crank angle sensor 17, and the period between the rising edges of the output of the crank angle sensor 17 is determined based on the output of counter 37. At prescribed intervals, timer 38 generates an interrupt request which is applied to interrupt input port P5 of the CPU 40. A/D converter 39 performs A/D conversion of the voltage $V_B$ of the unillustrated battery, and at prescribed intervals, the CPU 40 reads this battery voltage data. Timer 43 is preset by the CPU 40 and is triggered by output port P2 of the CPU 40. The timer 43 outputs pulses of a prescribed width, and this output drives the fuel injectors 14 through the driver 44. The CPU 40 sets timer 46 to a value called $T'_{DW}$ and sets timer 47 to the value of the ignition timing A. $T'_{DW}$ is the number of degrees of crankshaft rotation for which the current to the ignition coil 19 is interrupted each time the spark plugs 24 are fired.

Figure 8:
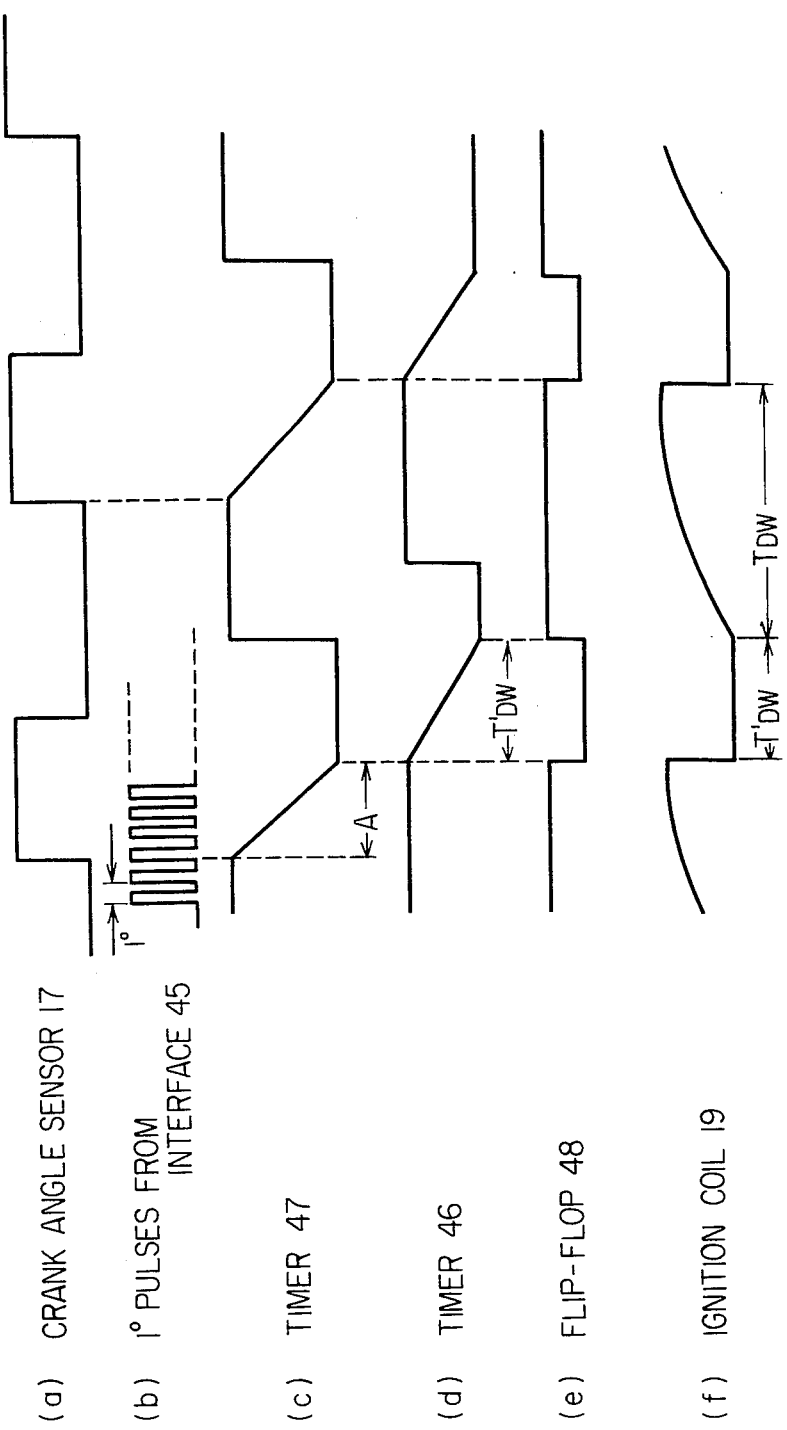
FIGS. 8(a–f) are a timing diagram showing the outputs of the crank angle sensor 17, timer 46, timer 47, the flip-flop 48, and the ignition coil 19 during the operation of the embodiment of FIG. 1.

FIG. 8 is a timing diagram showing the outputs of the crank angle sensor 17, interface 45, timer 47, timer 46, the flip-flop 48, and the ignition coil 19 during the operation of the present embodiment. As shown in this other figure, timers 46 and 47 are clocked by the one-degree pulses from interface 45. Timer 47 begins counting down to zero on the rising edge of the output of the crank angle sensor 17, and when timer 47 reaches zero, it resets the flip-flop 48 and interrupts the current to the ignition coil 19, causing the spark plugs 24 to fire. Timer 46 begins to count down to zero when timer 47 reaches zero, and when timer 46 reaches zero, it sets the flip-flop 48 and allows current to again flow to the ignition coil 19.

Figure 3:
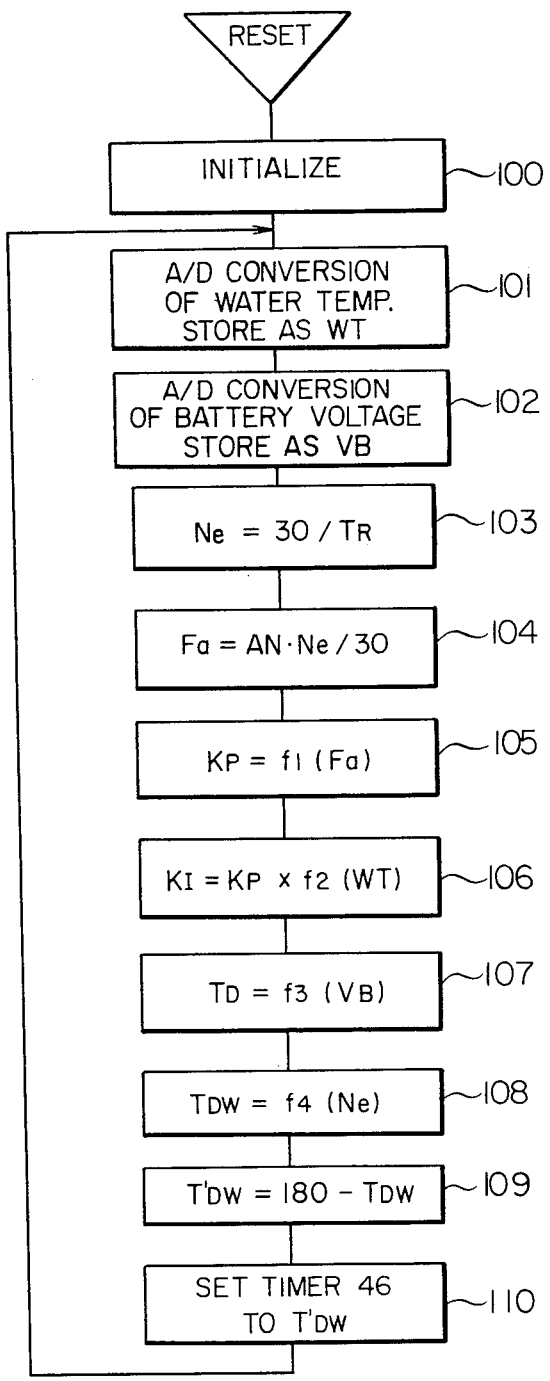
FIG. 3 is a flow chart of the main program executed by the CPU 40 of FIG. 2.
Figure 4:
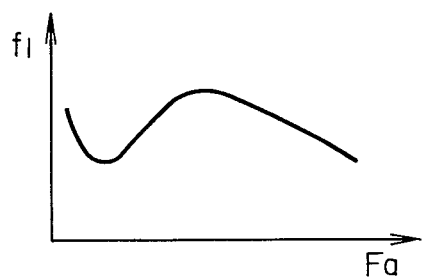
FIG. 4 is a diagram showing the relationship between the output frequency $F_a$ of the AFS of the embodiment of FIG. 2 and a function $f_1$ for determining a fundamental injection timing conversion coefficient.

Next, the operation of the CPU 40 will be explained while referring to the flow charts of FIGS. 3, 5, and 6. FIG. 3 illustrates the main program of the CPU 40. When a reset signal is input to the CPU 40, the RAM 42, the input ports, and the like are initialized in Step 100. In Step 101, A/D conversion of the output of the water temperature sensor 18 is performed and the result is stored in the RAM 42 as WT. In Step 102, A/D conversion of the battery voltage is performed and the result is stored in the RAM 42 as VB. In Step 103, the rotational speed $N_e$ in RPM of the engine is determined by calculating the value of $30/T_R$, wherein $T_R$ is the period in seconds of the output signal from the crank angle sensor 17 and equals the time for the crankshaft to rotate 180 degrees. In Step 104, the frequency $F_a$ of the output signal of the AFS 13 is calculated by the equation $AN \times N_e/30$. AN is referred to as load data; it is equal to the number of output pulses which are generated by the AFS 13 between the rising edges of two consecutive pulses of the crank angle sensor 17 and is indicative of the engine load. In Step 105, based on the output frequency $F_a$, a fundamental injection timing conversion coefficient $K_p$ is calculated using a function $f_1$ which has a value with respect to $F_a$ as shown in FIG. 4. In Step 106, the fundamental injection timing conversion coefficient $K_p$ is corrected by a function $f_2$, which depends on the value of the water temperature data WT, and the corrected value is stored in the RAM 42 as injection timing conversion coefficient $K_I$. In Step 107, based on the battery voltage data VB, a data table $f_3$ which is previously stored in the ROM 41 is read, and the dead time $T_D$ (the time lag in the response of the fuel injectors 14) is calculated and stored in the RAM 42. In Step 108, the conducting angle $T_{DW}$ of the ignition coil 19 (the number of degrees of crankshaft rotation during which current is supplied to the ignition coil 19 between spark plug firings) at a rotational speed of $N_e$ is calculated, in Step 109, $T'_{DW} = 180 - T_{DW}$ is calculated, and in Step 110, timer 46 is set to $T'_{DW}$. After Step 110, the program recyles by returning to Step 101.

Figure 5:
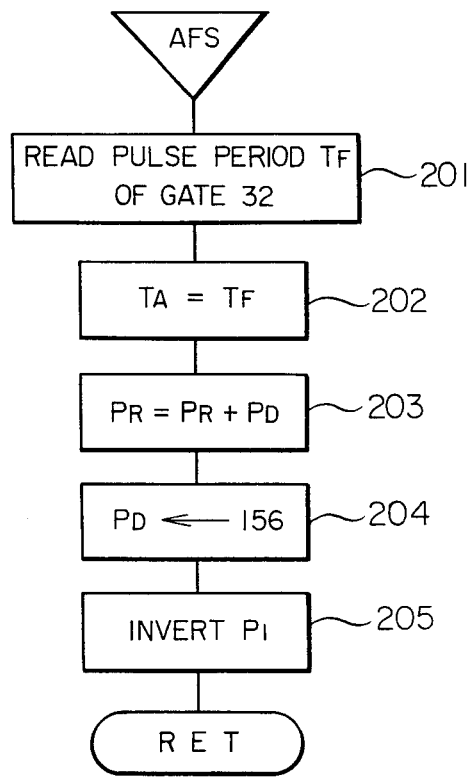
FIG. 5 and FIG. 6 are flow charts of interrupt handling routines performed by the CPU 40 of FIG. 2.

FIG. 5 illustrates an interrupt handling routine which is performed by the CPU 40 each time the output of the exclusive OR gate 32 falls. In Step 201, the output $T_F$ of counter 33 is read, and then counter 33 is cleared. $T_F$ is the period between consecutive rises in the output of the exclusive OR gate 32. In Step 202, the period $T_F$ is stored in the RAM 42 as the period $T_A$ of the output of the AFS 13. In Step 203, a value which is referred to as the remaining pulse data $P_D$ is added to the cumulative pulse data $P_R$ to obtain a new value for the cumulative pulse data $P_R$. The cumulative pulse data $P_R$ is the total number of pulses which are output by the AFS 13 between the rises in consecutive pulses in the output of the crank angle sensor 17 and is used as the value of AN in Step 104 of FIG. 3. For the convenience of processing, $P_R$ is incremented by 156 for each pulse from the AFS 13, so that the value of $P_R$ equals 156 times the actual number of output pulses from the AFS 13. In Step 204, the remaining pulse data $P_D$ is set equal to 156. . In Step 205, the level of output port P1 is inverted, and interrupt handling is completed.

Figure 6:
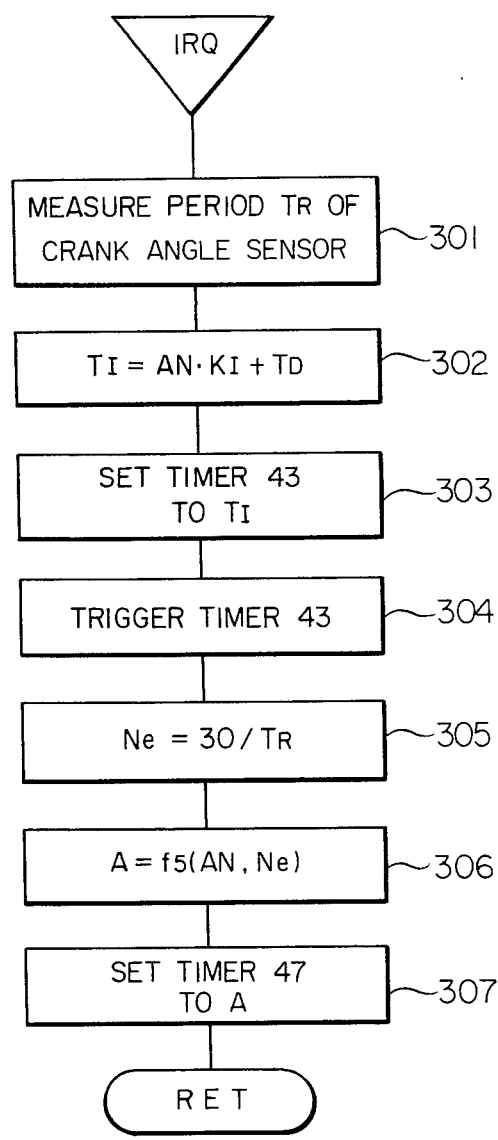

FIG. 6 illustrates an interrupt handling routine which is performed by the CPU 40 each time an interrupt request is input to interrupt input port P4, which takes place upon each rise in the output of the crank angle sensor 17. In Step 301, the period between the present rise and the previous rise in the output of the crank angle sensor 17 is read from counter 37 and is stored in the RAM 42 as period $T_R$. Counter 37 is then cleared. In Step 302, injection timing data $T_I$ is calculated based on the load data AN, the ignition timing conversion coefficient $K_I$, and the dead time $T_D$ in the manner $T_I = AN \times K_I + T_D$. In Step 303, timer 43 is set to the value of the injection timing data $T_I$. In Step 304, timer 43 is triggered, and the four fuel injectors 14 are simultaneously driven by driver 44 in accordance with the data $T_I$. In Step 305, the rotational speed $N_e$ is calculated based on $T_R$ in the same manner as in FIG. 3. In Step 306, the ignition timing A is determined based on the values of AN (the value of $P_R$ determined in Step 203) and $N_e$ by reading a data table $f_5$ which is stored in the ROM 41. The ignition timing A equals the number of degrees of crankshaft rotation after a rise in the output of the crank angle sensor 17 at which the spark plugs 24 are fired. In Step 307, timer 47 is set to the ignition timing A, and interrupt handling is completed.

Figure 7:
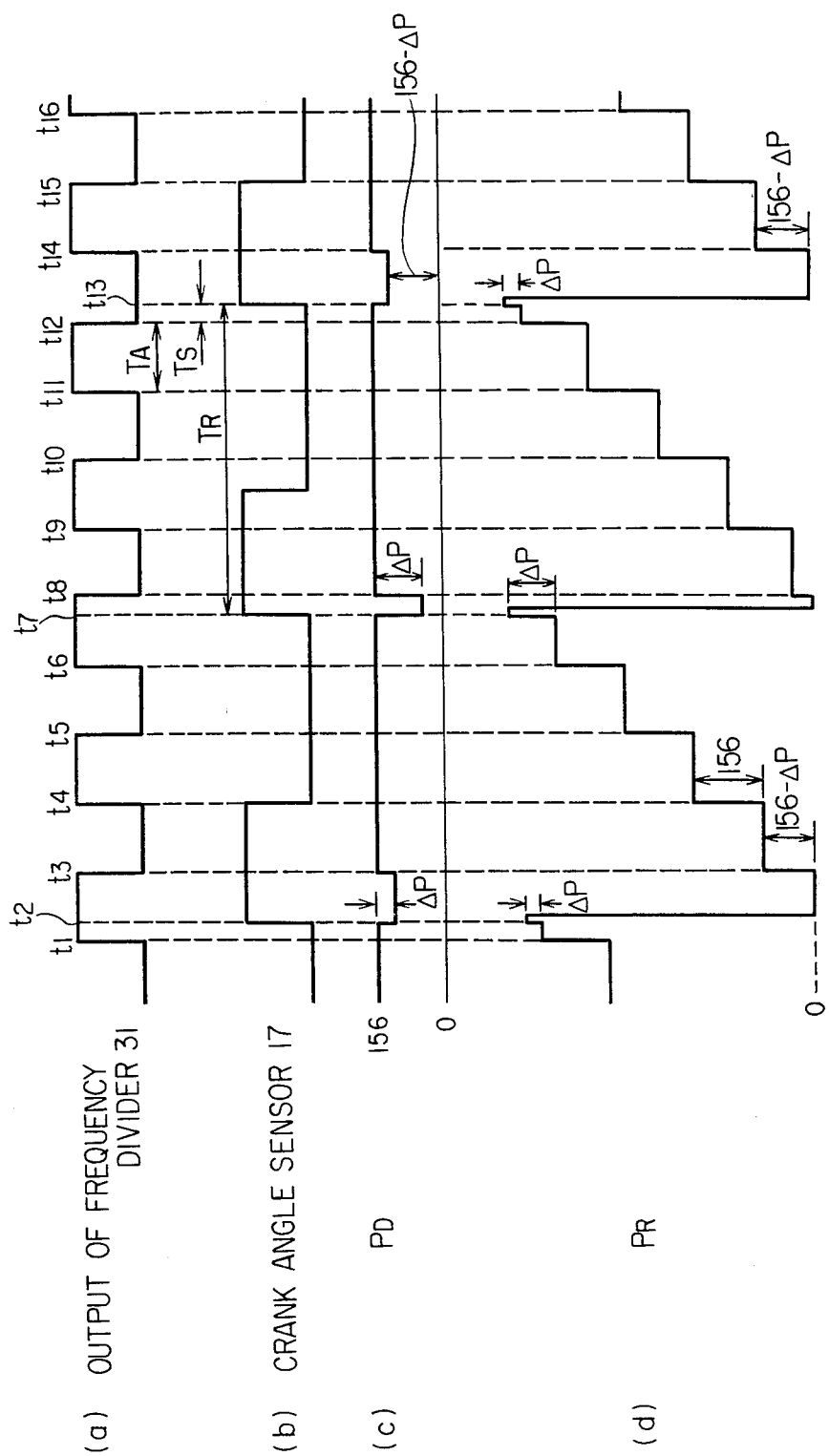
FIGS. 7(a–d) are a timing diagram showing the values of various parameters during the operation of the embodiment of FIG. 1.

FIG. 7 is a timing diagram illustrating (a) the output of the frequency divider 31, (b) the output of the crank angle sensor 17, (c) the calculated value of $P_D$, and (d) the calculated value of $P_R$ during the processing shown in FIGS. 5 and 6. As shown in FIG. 7, the value of the remaining pulse data $P_D$ is set at 156 each time the output of the frequency divider 31 rises or falls (corresponding to each rise in the output of the AFS 13). Upon each rise in the output of the crank angle sensor 17, the value of $P_D$ is decreased by $\Delta P$, which is equal to $156 \times T_S/T_A$, and the cumulative pulse data $P_R$ is increased by the valve of $P_D$ at each rise or fall in the output of the frequency divider 31.

In the manner described above, a first embodiment of an ignition timing control apparatus controls the ignition timing based on the intake air flow rate through the AFS during the previous half-revolution of the engine and the engine rotational speed. As a result, the number of calculations necessary to determine the ignition timing is minimized, the processing speed is therefore fast, and the apparatus can perform highly responsive control.

While the first embodiment of the present invention has good control responsiveness, it does not take account of the fact that during transitions in the intake air flow rate into the engine, the flow rate measured by the AFS 13 will be different from the actual flow rate into the cylinders of the engine. In some cases, therefore, the control of ignition timing performed by the embodiment of FIG. 1 may be inaccurate.

Accordingly, a second embodiment of the present invention is equipped with a calculating mechanism which calculates the actual flow rate of air into the engine cylinders based on the output of the AFS 13. The physical structure of this second embodiment is identical to that illustrated in FIG. 2 for the first embodiment, but the program which controls the operation of the CPU 40 is different from that of the first embodiment. As a result, the conceptual configuration of the second embodiment is as shown in the block diagram of FIG. 9. It differs from the first embodiment in that a calculating mechanism 21 is connected between the pulse counter 20 and the controller 22. The calculating mechanism 21 receives the output signal from the pulse counter 20 and calculates the actual intake air flow rate into the cylinders of the engine 1 in a manner which will be described below and produces a corresponding output signal. The pulse counter 20 and the calculating mechanism 21 together constitute means for sensing the load on the engine. The controller 22 then controls the fuel injectors 14 and the ignition coil 19 of the engine 1 based on the output of the calculating mechanism 21, the crank angle sensor 17, and the water temperature sensor 18.

Figure 9:
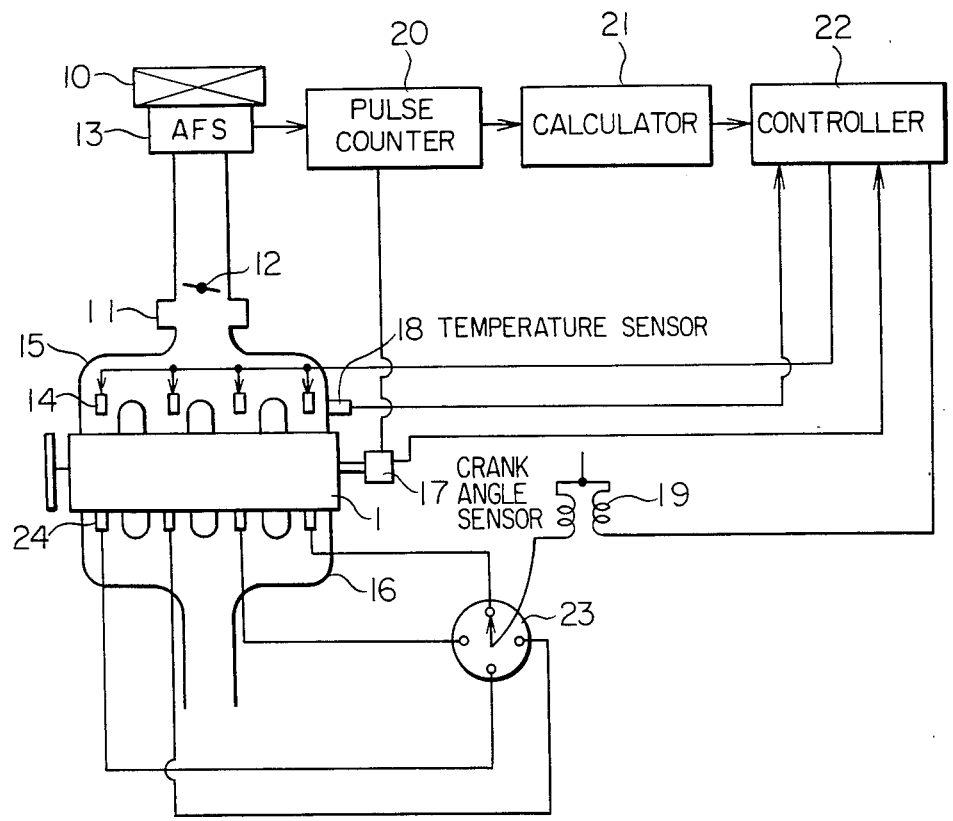
FIG. 9 is a block diagram illustrating the conceptual structure of a second embodiment of the present invention.
Figure 10:
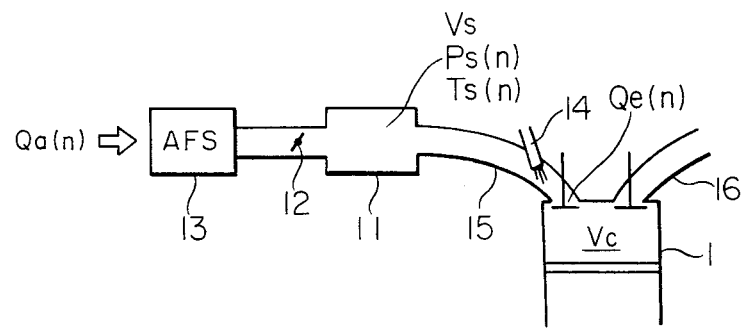
FIG. 10 is a block diagram of a model of the air intake system of an internal combustion engine employing the present invention.

Before describing the operation of the embodiment of FIG. 9 in greater detail, the principles underlying the calculations which are performed by the CPU 40 will be explained while referring to FIGS. 10 through 12. FIG. 10 illustrates a model of the air intake system of the internal combustion engine 1 of FIG. 9. The displacement of the engine 1 is $V_C$, while the volume from the throttle valve 12 to the intake valves of the engine 1 is $V_s$.

Figure 11:
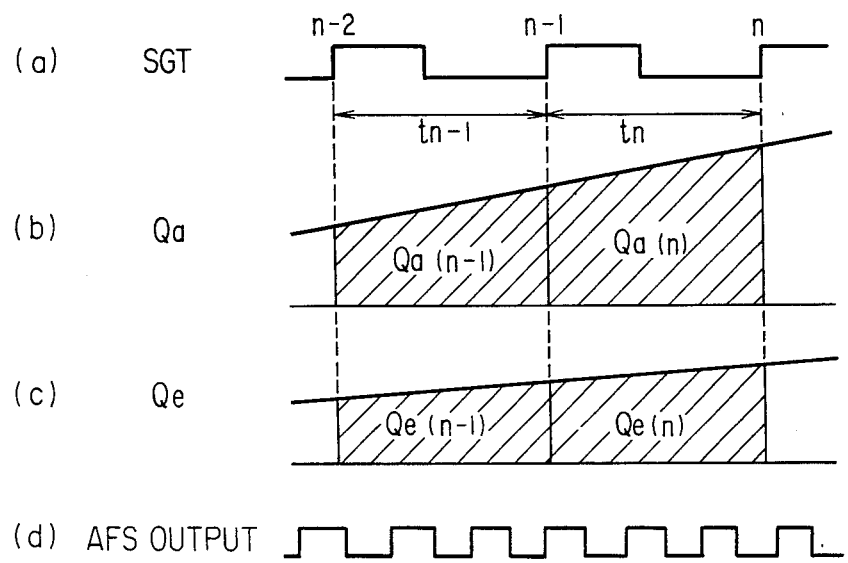
FIGS. 11(a–d) are a diagram of the relationship between the air intake into the AFS of FIG. 10 and the air intake into the cylinders of the engine.

FIG. 11 illustrates the relationship between the air flow rate $Q_a$ into the AFS 13 and the air flow rate $Q_e$ into the cylinders of the engine 1. In FIG. 11, (a) illustrates the output (abbreviated as SGT) of the crank angle sensor 17 which outputs a pulse every 180 degrees of crankshaft rotation, while (d) illustrates the output of the AFS 13.

The length of time between the (n-2)th rise and the (n-1)th rise of SGT is $t_{n-1}$, and the time between the (n-1)th rise and the nth rise is $t_n$. The amounts of intake air which pass through the AFS 13 during periods $t_{n-1}$ and $t_n$ are $Q_{a(n-1)}$ and $Q_{a(n)}$, respectively, and the amounts of air which enter the cylinders of the engine 1 during the same periods $t_{n-1}$ and $t_n$ are $Q_{e(n-1)}$ and $Q_{e(n)}$, respectively. Furthermore, the average pressure and the average intake air temperature in the surge tank 11 during periods $t_{n-1}$ and $t_n$ are respectively $P_{s(n-1)}$ and $P_{s(n)}$ and $T_{s(n-1)}$ and $T_{s(n)}$. $Q_{a(n-1)}$ corresponds to the number of output pulses from the AFS 13 in the time period $t_{n-1}$. As the rate of change of the intake air temperature is small, $T_{s(n-1)}$ is approximately equal to $T_{s(n)}$, and if the charging efficiency of the engine 1 is constant, then the following relationships hold:

$$P_{s(n-1)} \times V_c = Q_{e(n-1)} \times R \times T_{s(n)} \quad (1)$$

$$P_{s(n)} \times V_c = Q_{e(n)} \times R \times T_{s(n)} \quad (2)$$

wherein R is a constant. If the amount of air which remains in the surge tank 11 and the air intake pipe 15 during period $t_n$ is $\Delta Q_{a(n)}$, then $$\begin{aligned}\Delta Q_{a(n)} &= Q_{a(n)} - Q_{e(n)} \\ &= V_s \times (1/RT_s) \times (P_{s(n)} - P_{s(n-1)})\end{aligned} \quad (3)$$

and from Equations (1)–(3), the following equation is obtained:

$$Q_{e(n)} = [1/(1+V_c/V_s)] \times Q_{e(n-1)} + [1 - 1/(1+V_c/V_s)] \times Q_{a(n)} \quad (4)$$

Accordingly, the amount of air $Q_{e(n)}$ which enters the cylinders of the engine 1 in period $t_n$ can be calculated based on the amount of air $Q_{a(n)}$ which passes through the AFS 13. For example, if $V_c = 0.5$ liters and $V_s = 2.5$ liters, then $$Q_{e(n)} = 0.83 \times Q_{e(n-1)} + 0.17 \times Q_{a(n)} \quad (5)$$

Figure 12:
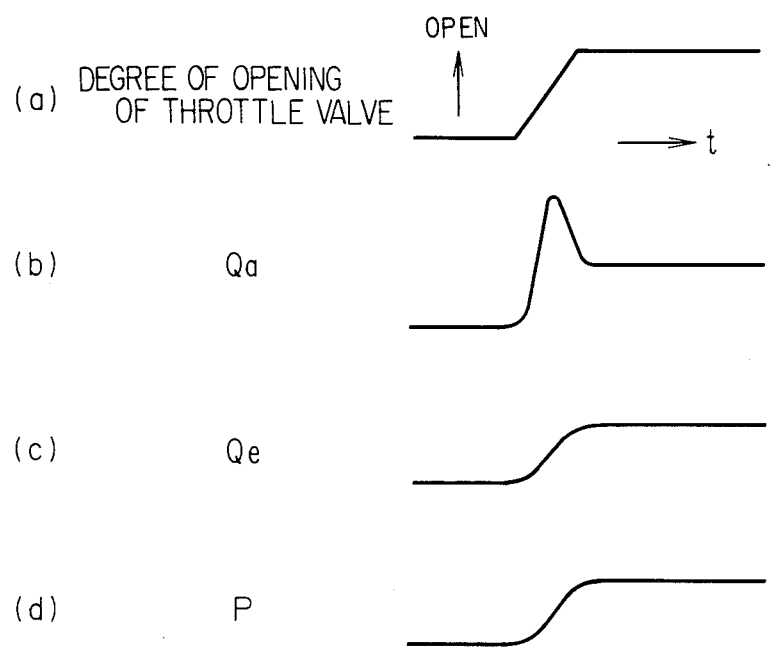
FIGS. 12(a–d) are a waveform diagram showing the changes in the rate of air intake into the air intake system of FIG. 10 when the throttle valve is suddenly opened.

FIG. 12 illustrates the state within the air intake passageway 15 when the throttle valve 12 is suddenly opened. In FIG. 5, (a) shows the degree of opening of the throttle valve 12, and (b) shows the air flow rate $Q_a$ through the AFS 13. As can be seen from (b), the air flow rate $Q_a$ abruptly increases and overshoots a steady-state value, after which it decreases to the steady-state value. (c) shows how the air flow rate $Q_e$ into the cylinders of the engine increases gradually to the same steady-state value without overshooting, and (d) shows the variation in the pressure P within the surge tank 11.

Figure 13:
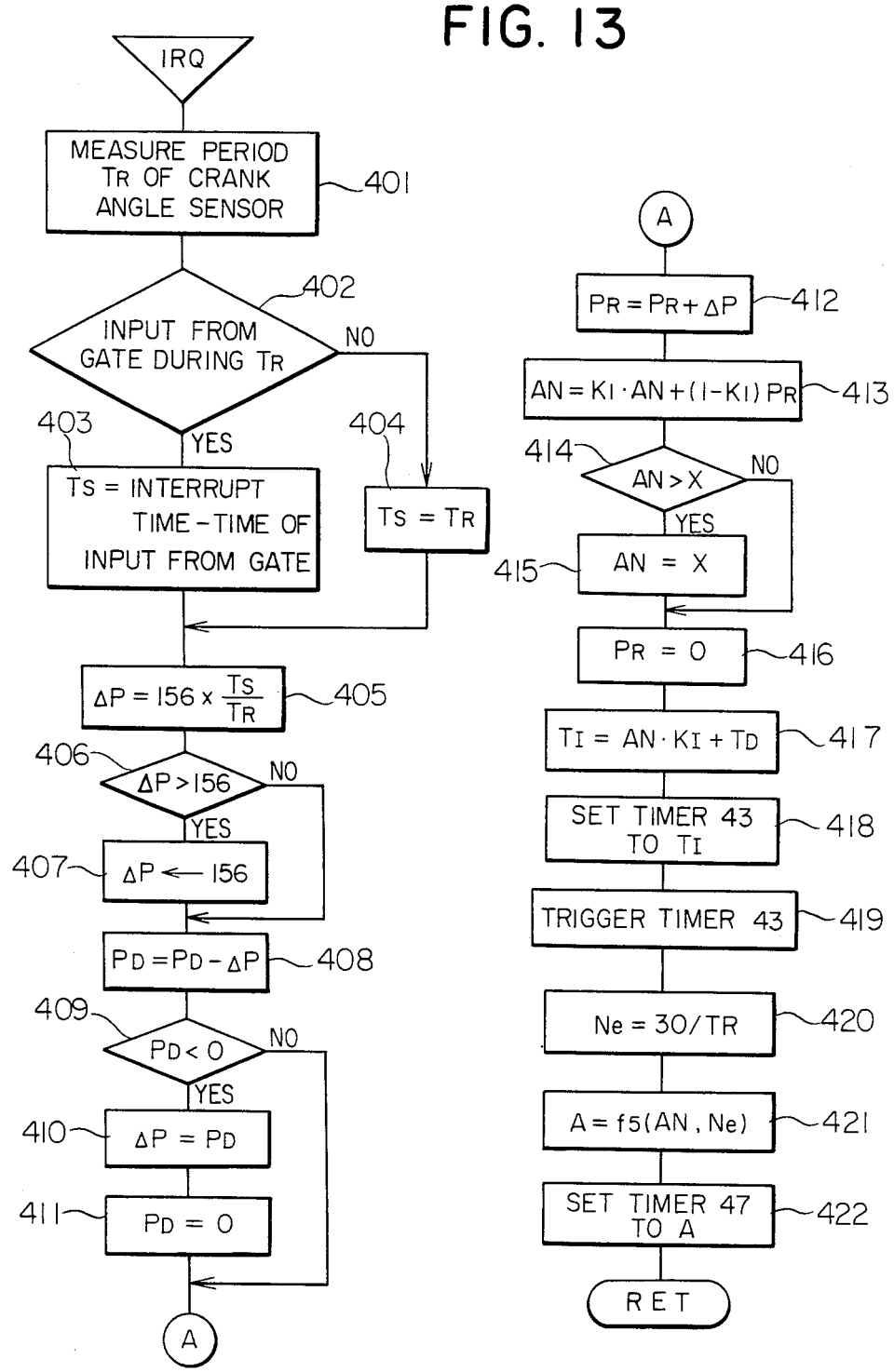
FIG. 13 is a flow chart illustrating an interrupt handling routine which is performed by the CPU of the embodiment of FIG. 9.

The basic program executed by the CPU 40 of this second embodiment is identical to the program illustrated in FIG. 3, and an interrupt handling routine which is performed each time the output of the exclusive OR gate 32 falls is identical to that illustrated in FIG. 5. The difference between the operation of the first embodiment and the second embodiment lies in the interrupt handling routine which is performed each time there is an interrupt request to interrupt input port P4 when the output of the crank angle sensor 17 rises. The interrupt handling routine which is performed at this time by the embodiment of FIG. 9 will be described while referring to the flow chart of FIG. 13. This flow chart will be explained for the case that an interrupt request is input to interrupt input port P4 at time $t_{13}$ in FIG. 7. In Step 401, the period between the present rise (at time $t_{13}$) and the previous rise (at time $t_7$) in the output of the crank angle sensor 17 is read from counter 37 and is stored in the RAM 42 as period $T_R$. Counter 37 is then cleared. In Step 402, it is determined whether there was an output pulse from the exclusive OR gate 32 during the period $T_R$. If so, then in Step 403, the time difference $T_S$ between the time of the immediately preceding output pulse of the gate 32 (at time $t_{12}$) and the time of the present interrupt request (time $t_{13}$) is calculated. In the case of FIG. 7, $T_S = t_{13} - t_{12}$. When there was no output pulse from the gate 32 during period $T_R$, then in Step 404, period $T_S$ is set equal to period $T_R$. In Step 405, the time difference $T_S$ is converted into pulse data $\Delta P$ using the formula $\Delta P = 156 \times T_S/T_A$. The pulse data $\Delta P$ is the amount by which the cumulative pulse data $P_R$ should be increased for the length of time $T_S$. As can be seen from FIG. 7, the exact value of $\Delta P$ is $156 \times T_S/(t_{14} - t_{12})$. However, as $t_{14}$ has yet to take place, it is assumed that $(t_{14} - t_{12})$ is equal to $T_A$, or in other words, it is assumed that the output of the exclusive OR gate 32 will remain substantially constant over two cycles. In Step 406, if the value of the pulse data $\Delta P$ is less than or equal to 156, then the program proceeds to Step 408, and if it is larger, then in Step 407 $\Delta P$ is reduced to 156. In Step 408, the remaining pulse data $P_D$ is decreased by the pulse data $\Delta P$, and the decreased value is made the new remaining pulse data $P_D$. In Step 409, if the remaining pulse data $P_D$ is positive or zero, then the program proceeds to Step 412, and otherwise, the calculated value of the pulse data $\Delta P$ is too much greater than the output pulse of the AFS 13, so in Step 410, the pulse data $\Delta P$ is set equal to $P_D$, and in Step 411, the remaining pulse data $P_D$ is set equal to zero. In Step 412, the cumulative pulse data $P_R$ is increased by the pulse data $\Delta P$ and a new value for the cumulative pulse data $P_R$ is obtained. $P_R$ is proportional to the number of pulses which it is thought that the AFS 13 output between consecutive rises in the output of the crank angle sensor 17, i.e., between times $t_7$ and $t_{13}$. In Step 413, a calculation corresponding to Equation (5) is performed and a new value of the load data AN is calculated based on the old value of the load data AN which was calculated up to the previous rise in the output of the crank angle sensor 17 (at time $t_7$) and the cumulative pulse data $P_R$ which was just calculated. Namely, AN is calculated using the formula $AN = (K-1)AN + (1-K_1)P_R$, wherein $K_1$ is a constant. In Step 414, if the new load data AN is larger than a prescribed value X, then in Step 415 it is reduced to X so that even when the throttle of the engine 1 is fully open the load data AN will not overly exceed the actual value. In Step 416, the cumulative pulse data $P_R$ is set equal to zero. In Step 417, injection timing data $T_I$ is calculated based on the load data AN, the injection timing conversion coefficient $K_I$, and the dead time $T_D$ in the manner $T_I = (AN \times K_I) + T_D$. In Step 418, the timer 43 is set to the value of $T_I$, and in Step 419, timer 43 is triggered, causing the four fuel injectors 14 to be simultaneously driven by driver 44 in accordance with the injection timing data $T_I$. In Step 420, the rotational speed $N_e$ is calculated based on the value of $T_R$. In Step 421, based on the values of AN and $N_e$, the ignition timing A is found by reading a data table $f_5$ which was previously stored in the ROM 41. In Step 422, timer 47 is set to the value of the ignition timing A, and interrupt handling is completed.

Thus, in accordance with the above-described second embodiment of the present invention, the fuel injectors 14 and the ignition coil 19 are controlled in accordance with the actual intake air flow rate into the cylinders of the engine 1. Therefore, both the supply of fuel and the ignition timing can be accurately controlled, even when the intake air flow rate is in transition.

In both of the above-described embodiments, the exclusive OR gate 32 is controlled so that its output will vary at twice the rate of the output of the frequency divider 31, i.e., so that it will vary at the same rate as the output of the AFS 13. However, the frequency of the output of the AFS 13 depends upon the load on the engine and typically varies from 40 to 1200 Hz. Furthermore, the frequency of the AFS output greatly fluctuates under a heavy load. Therefore, when the engine load is heavy and the AFS output frequency is extremely high, there may be insufficient time for the CPU 40 to keep up with the output signals. Therefore, it is also possible to program the CPU 40 so that when the engine load is above a certain level (as indicated by the number of AFS output pulses per each output pulse of the crank angle sensor 17) the exclusive OR gate 32 will be controlled so that its output changes at the same rate as the frequency divider 31, i.e., at half the rate of the AFS output, thereby guaranteeing adequate processing time for the CPU 40 and enabling it to accurately control the fuel supply and the ignition timing over the entire operating range of the engine. The output of the exclusive OR gate 32 can be made to change at the same rate as the frequency divider 31 simply by keeping the level of output port P1 constant.

In the above-described embodiments, the output pulses of the AFS 13 are counted between the rises in the output of the crank angle sensor 17, but counting may be performed between falls. Furthermore, the number of output pulses of the AFS 13 can be counted over several periods of the output of the crank angle sensor 17 instead of over a single period. Also, although the actual number of output pulses of the AFS 13 were counted, a value which is the number of output pulses of the AFS 13 multiplied by a constant corresponding to the output frequency of the AFS 13 may be counted. In addition, the angle of the crankshaft need not be detected by a crank angle sensor 17, and the same effects can be obtained using the ignition signal for the engine.

What is claimed is:

1. An ignition timing control apparatus for an internal combustion engine comprising:
    air flow sensing means for sensing air flow rate into an air intake pipe for an engine and producing an electrical output signal in the form of pulses having a frequency which is proportional to the air flow rate;
    crank angle sensing means for producing an electrical output pulse each time a crankshaft of the engine is at a prescribed crank angle;
    load sensing means for sensing load on the engine based on the output signal produced by said air flow sensing means during a period between prescribed angles represented by output pulses from said crank angle sensing means and producing load data corresponding to the sensed engine load and represented by an output signal; and
    control means for calculating ignition timing of the engine based on rotational speed of the engine and the load data from said load sensing means and for controlling current to an ignition coil of the engine in accordance with the calculated ignition timing.

2. An ignition timing control apparatus as claimed in claim 1 wherein said load sensing means comprises pulse counting means for counting output pulses from said air flow sensing means between consecutive output pulses from said crank angle sensing means and producing an output signal corresponding to the number of counted pulses which is input to said control means representing the load data.

3. An ignition timing control apparatus as claimed in claim 1 wherein said load sensing means comprises:
    pulse counting means for counting output pulses from said crank angle sensing means and producing an output signal corresponding to the number of counted pulses; and
    calculating means for calculating an amount of intake air into cylinders of the engine based on the output signal of said pulse counting means and producing a corresponding output signal which is input to said control means representing the load data.

4. An ignition timing control apparatus as claimed in claim 1 wherein said air flow sensing means is a Karman vortex air flow sensor.

5. An ignition timing control apparatus as claimed in claim 1 wherein said crank angle sensing means comprises means for producing an output pulse for every 180 degrees of crankshaft rotation.

6. An ignition timing control apparatus as claimed in claim 1 wherein said control means comprises:
    a memory in which is stored a function table which gives ignition timing as a function of load data and engine rotational speed;
    means for determining a value of the ignition timing from said function table based on the load data from said load sensing means and the engine rotational speed; and
    means for controlling current to the ignition coil based on the ignition timing which is determined from said function table.

* * * * *